United States Patent [19]

Hirosawa

[11] Patent Number: 5,204,918

[45] Date of Patent: Apr. 20, 1993

[54] METHOD OF AND APPARATUS FOR CORRECTING CONTOUR OF IMAGE

[75] Inventor: Makoto Hirosawa, Kyoto, Japan

[73] Assignee: Dainippon Screen Mfg. Co., Ltd., Japan

[21] Appl. No.: 720,612

[22] Filed: Jun. 25, 1991

[30] Foreign Application Priority Data

Jun. 28, 1990 [JP] Japan .................. 2-171248

[51] Int. Cl.⁵ .............................. G06K 9/36
[52] U.S. Cl. ........................ 382/41; 382/22; 382/25; 382/54
[58] Field of Search ............ 382/21, 22, 25, 54, 382/41; 358/101, 107, 452, 453, 464

[56] References Cited

U.S. PATENT DOCUMENTS

| | | | |
|---|---|---|---|
| 4,644,583 | 2/1987 | Watanabe et al. | 382/25 |
| 4,868,884 | 9/1989 | Miyazaki et al. | 382/22 |
| 4,876,729 | 10/1989 | Watanabe et al. | 382/54 |
| 5,018,211 | 5/1991 | Jaffe et al. | 382/22 |
| 5,038,383 | 8/1991 | Usumoto et al. | 382/22 |
| 5,091,967 | 2/1992 | Ohsawa | 382/22 |

*Primary Examiner*—Jose L. Couso
*Attorney, Agent, or Firm*—Ostrolenk, Faber, Gerb & Soffen

[57] ABSTRACT

A contour of an image is corrected to prevent a dropout in a multicolor print due to registration mismatch. Vector data of two supplemental contours C2a and C2b are obtained from vector data of a contour subjected to the contour correction. The supplemental contours are distanced by a length W from the contour C2. Densities of image parts R1 and R2 within the contour correction region R2m that is defined by the supplemental contours are compared with each other, and the higher density (or the lower density) is selected as a correction density for the contour correction region. The contour correction region is filled with the correction density; this is equivalent to shifting the contour C2 to either of the two supplemental contours.

23 Claims, 11 Drawing Sheets

$Db1 \neq Db2 \neq Db3$

METHOD OF AND APPARATUS FOR CORRECTING CONTOUR OF IMAGE

BACKGROUND OF THE INVENTION

1. Field of the Invention

The present invention pertains to a method of and an apparatus for correcting a contour of an image portion in an integrated image including plural image portions.

2. Description of the Background Art

Figure 1A:
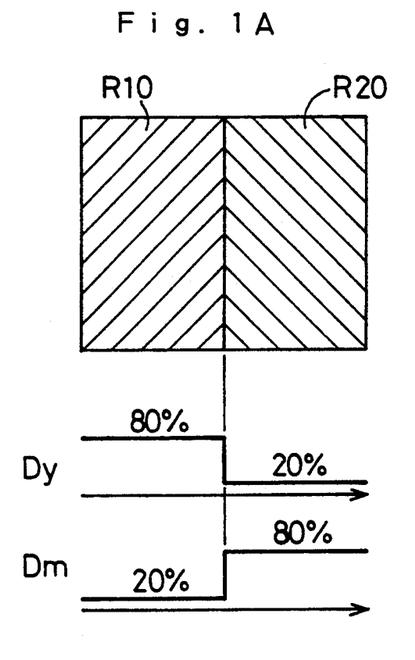
FIGS. 1A through 1C are schematic views illustrating registration mismatch of adjacent image parts.
Figure 1B:
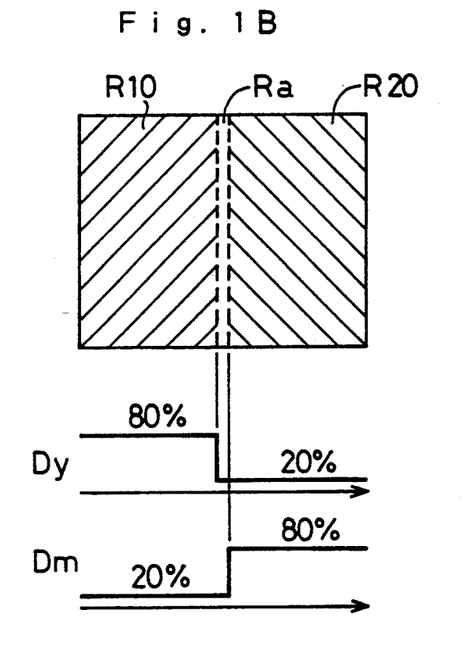
Figure 1C:
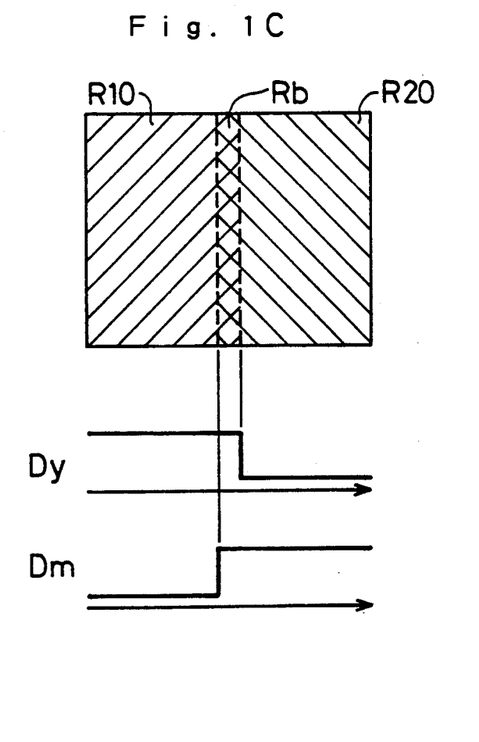

In multi-color printing, a dropout (or a non-filled area) is sometimes observed on the border between different image portions or regions (hereinafter referred to as image parts) due to registration mismatch or misalignment among plural color plates. FIGS. 1A through 1C are schematic views illustrating examples of registration mismatches of a printed image including two image parts.

FIG. 1A shows an image registered accurately. Distributions of yellow density Dy and magenta density Dm over two image parts R10 and R20 are shown in the lower part of FIG. 1A. The region R10 is a tint region, i.e. a region of a uniform dot % (or a uniform halftone-dot area rate), having a yellow component of 80 dot % and a magenta component of 20 dot %, and the region R20 is a tint region having a yellow component of 20 dot % and a magenta component of 80 dot %.

FIG. 1B shows an example of an image with a registration mismatch. A yellow plate is shifted leftwards and a magenta plate rightwards from their accurate positions shown in FIG. 1A. Here a new region Ra is formed between the regions R10 and R20, whose yellow and magenta components are both 20 dot %. Hence, the region Ra is lighter in color than the other regions R10 and R20 and is consequently more white. Such a region as Ra is not included in the correct printed image and is clearly distinguished from the other regions because of its whitish shade; thus it deteriorates the appearance of the printed matter.

In the instant specification, a dropout or a dropout region designates a region, e.g., region Ra of FIG. 1B, that is formed due to registration mismatch among plural color plates and which has a lighter color than the surrounding regions as well as a region in which no inks are applied.

FIG. 1C shows another example of an image due suffering from registration mismatch. The yellow plate is shifted rightwards and the magenta plate leftwards from the accurate positions shown in FIG. 1A. Here a new region Rb is formed between the regions R10 and R20, whose yellow and magenta components are both 80 dot %. Hence the region Ra is darker than the other regions R10 and R20 and is blackish consequently. The correct printed image does not include a region such as Rb; the region Rb is not distinguishable from the other regions but looks like part of a boundary line because of its blackish shade.

When a printed image is formed while printing plates are mis-registered as shown in FIG. 1B, the dropout region Ra deteriorates the printed image. Plates for forming a printed image as shown in FIG. 1C are currently preferred. Hereinafter in the specification, "processing for correcting image contours" denotes processing for correcting contours of image parts to form such preferred printing plates. When contours of image parts are corrected adequately, occurrence of a dropout region will be prevented even in the case of registration mismatch as shown in FIG. 1B.

Such processing for correcting image contours is not easily performed in consideration of respective dot percents of adjacent image parts and thus requires skilled operators.

Figure 2:
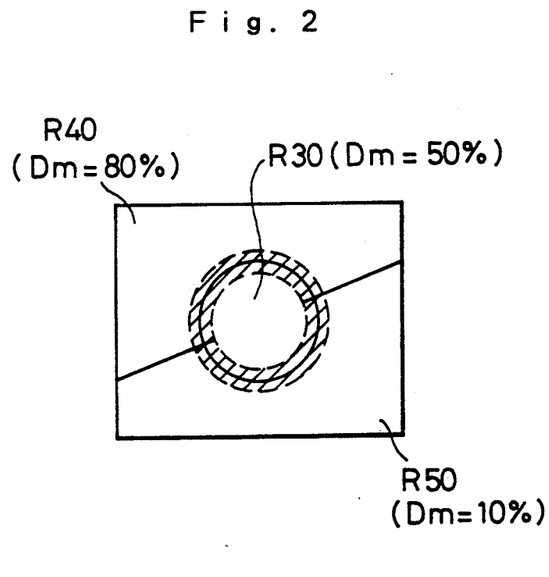
FIG. 2 is a schematic view showing an example which requires complicated contour correction.

FIG. 2 is a schematic view showing the difficulty in processing to correct image contours. The printed image of FIG. 2 includes three regions R30, R40, and R50. The regions R30, R40, and R50 have magenta components of 50 dot %, 80 dot %, and 10 dot %, respectively. In conventional processing for correcting image contours, an operator determines the shape of a region to be corrected, i.e., a shaded region in FIG. 2, and then specifies a dot % of the region. In FIG. 2, for example, 80 dot % is specified for a range surrounded by the regions R30 and R40 and 50 dot % for a region surrounded by the regions R30 and R50 for preventing an occurrence of a dropout due to registration mismatch.

In the above conventional method, only skilled operators can accurately determine the dimension of a region to be corrected and adequately specify a dot % of the various regions.

SUMMARY OF THE INVENTION

An object of the present invention is accordingly to provide a method of and an apparatus for easily correcting a contour of an image without need for skilled operators.

In accordance with the present invention, a method of and an apparatus for correcting a contour of an image part in an integrated image comprising plural image parts, includes the method steps of:

(a) drawing each of two supplemental contours apart from the contour by a predetermined distance;

(b) comparing first and second densities of first and second portions of a contour correction region which is defined to be surrounded by the two supplemental contours, the first and second portions being located across the contour, thereby determining a correction density in the contour-correction region on the basis of the comparing; and (c) filling the contour correction region with the correction density to substantially obtain a corrected contour.

In the above method, the contour of an image part is substantially shifted to either of the two supplemental contours by filling the contour correction region defined to be surrounded by the two supplemental contours with the correction density.

According to an aspect of the present invention, the method comprises the steps of:

(a) preparing image part data representing the respective image parts, and contour data representing the contour;

(b) obtaining two sets of supplemental contour data representing two supplemental contours each apart from the contour by a predetermined distance;

(c) comparing, on the basis of the image part data, first and second densities of first and second portions of a contour correction region which is defined to be surrounded by the two supplemental contours, the first and second portions being located across the contour, thereby determining a correction density in the contour-correction region on the basis of the comparison; and (d) producing corrected integrated-image data representing a corrected integrated-image filled with the correction density.

Preferably, the contour data prepared at the step (a) represent respective contours of the image parts;

the step (a) further comprises the step of: (a-1) specifying a priority for each of the image parts; and the method comprises, between the steps (a) and (b), the step of: (e) selecting one of the image parts in order of increasing priority; and wherein the procedure from the step (e) through the step (c) is serially executed for each of at least those image parts which have priorities higher than a lowest priority.

The step (a) further comprises the step of (a-2) preparing an image frame memory for memorizing raster image data for at least a part of the integrated image; and the method comprises, between the steps (e) and (b), the step of:

(f) obtaining raster image data of the selected image part on the basis of the image part data and overwriting the raster image data in the image frame memory; and the step (d) is performed by changing a density of the contour correction region with the correction density in the raster image data stored in the image frame memory; and the procedure from the step (e) through the step (d) is serially executed for each of at least those image parts which have priorities higher than the lowest.

Further, the step (c) is performed for each pixel on the contour while the first and second densities are found with respect to pixels across the contour.

According to another aspect of the present invention, the step (a) further comprises the step of (a-2) preparing an image frame memory for memorizing raster image data for at least a part of the integrated image; and the method further comprises, between the steps (c) and (d), the step of:

(g) defining the contour correction region filled with the correction density as a new image part having a priority just above the priority of the selected image part selected at the step (a-1), and producing image part data representing the new image part; and wherein the procedure from the step (e) through the step (g) is serially executed for each of at least those image parts which have priorities higher than the lowest; and the step (d) is performed by repeating the steps of: (d-1) selecting one of the image parts in order of increasing priority; (d-2) obtaining raster image data of the selected image part on the basis of the image part data; and (d-3) overwriting the raster image data in the image frame memory.

Preferably, the step (c) comprises the steps of:

(c-1) finding subregions in that part of the contour correction region which does not include the selected image part, the subregions belonging to respective image parts different from each other; and (c-2) performing the comparing and the determining steps with respect to each of the subregions.

In addition, the image parts have uniform densities, respectively. The correction density is determined to be the higher of the first and second densities. The raster image data is multi-digital data.

These and other objects, features, aspects and advantages of the present invention will become more apparent from the following detailed description of the present invention when taken in conjunction with the accompanying drawings.

DESCRIPTION OF THE PREFERRED EMBODIMENT

A. First Embodiment

A-1: Structure of Apparatus

Figure 3:
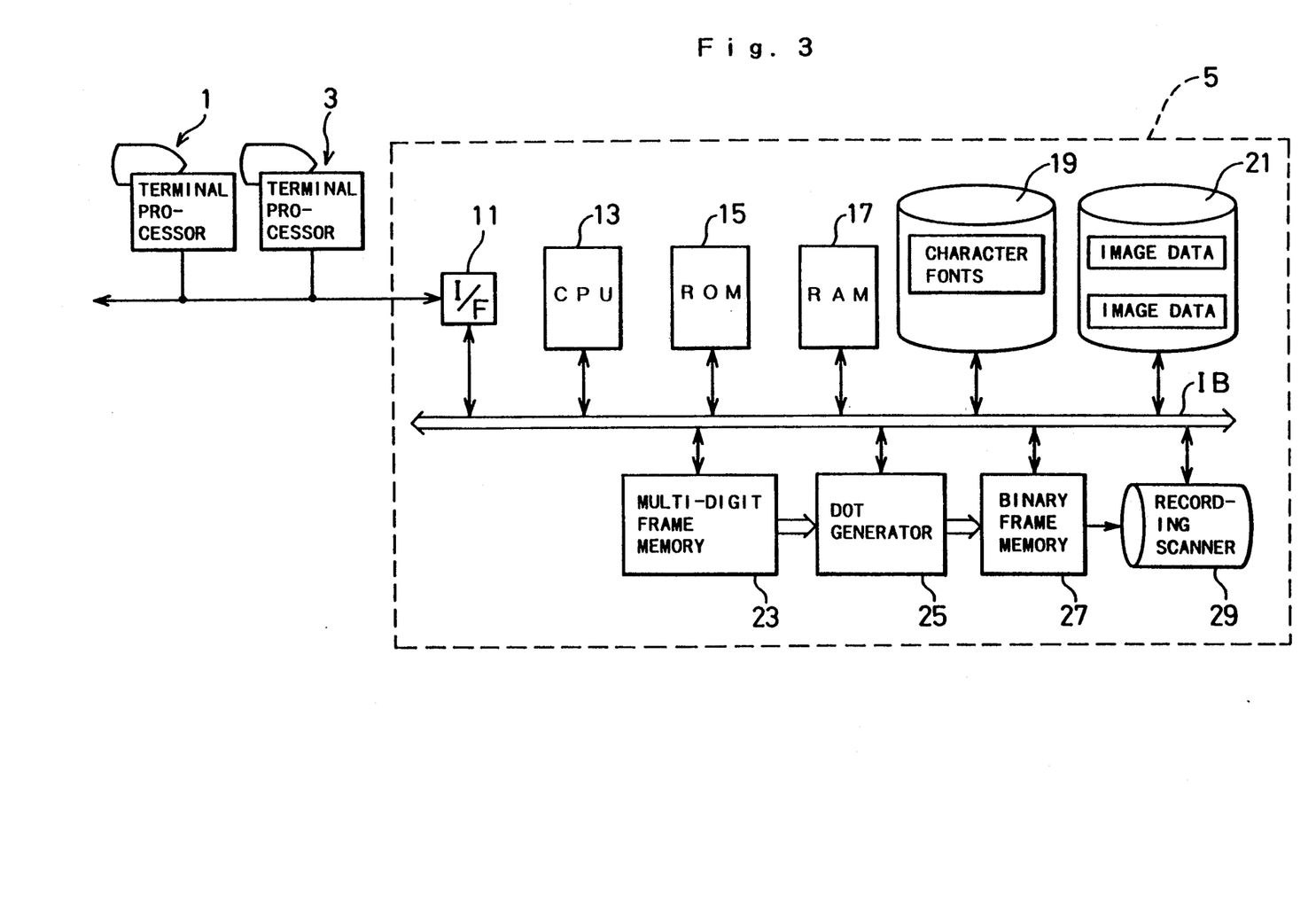
FIG. 3 illustrates the overall structure of an apparatus to which a first embodiment of the present invention is applied.

FIG. 3 is a block diagram of an image editing system in accordance with a first embodiment according to the present invention.

The image editing system includes front end processors 1 and 3, and an integrated-image recording apparatus 5, which are connected to one another through a LAN (local area network).

Each of the front end processors 1 and 3 is a personal computer or a work station. An operator edits an image including characters, diagrams, and picture elements through the front end processor 1 or 3. The front end processor 1 or 3 expresses the edited image (hereinafter referred to as an integrated image) by a program written in a page description language and outputs the program representing the integrated image. The page description language is generally abbreviated as PDL and is available under the name 'Postscript', 'Interpress', or 'DDL'. A program of an integrated image expressed by the page description language is hereinafter referred to as a PDL program.

The integrated image recording apparatus 5 receives the PDL program representing the integrated image and records the integrated image on a halftone dot film or the like. The integrated image recording apparatus 5 includes a front end interface 11 for inputting and outputting data into and from the front end processors 1 and 3; a CPU 13 for executing various processing based on preset control programs and controlling the whole system of the integrated image recording apparatus 5; a ROM 15 for storing the preset programs and initial data required for the processing in the CPU 13; a RAM 17 which various data are temporarily read from and written in for assisting the processing in the CPU 13; a first magnetic disk unit 19 for storing character fonts in advance; and a second magnetic disk unit 21 for storing picture elements. The integrated image recording apparatus 5 further includes a multiple digit frame memory 23 for temporarily storing multiple-digit image data (e.g., of 8 bits); a dot generator 25 for generating halftone image data (binary data) based on the multiple-digit image data; a binary frame memory or a bit map memory 27 for storing the binary data; and a recording scanner scanner for recording a halftone image on the basis of the binary data on a film or the like. All the above constituents are interconnected through an internal bus IB.

A-2: Processing Steps

Figure 4:
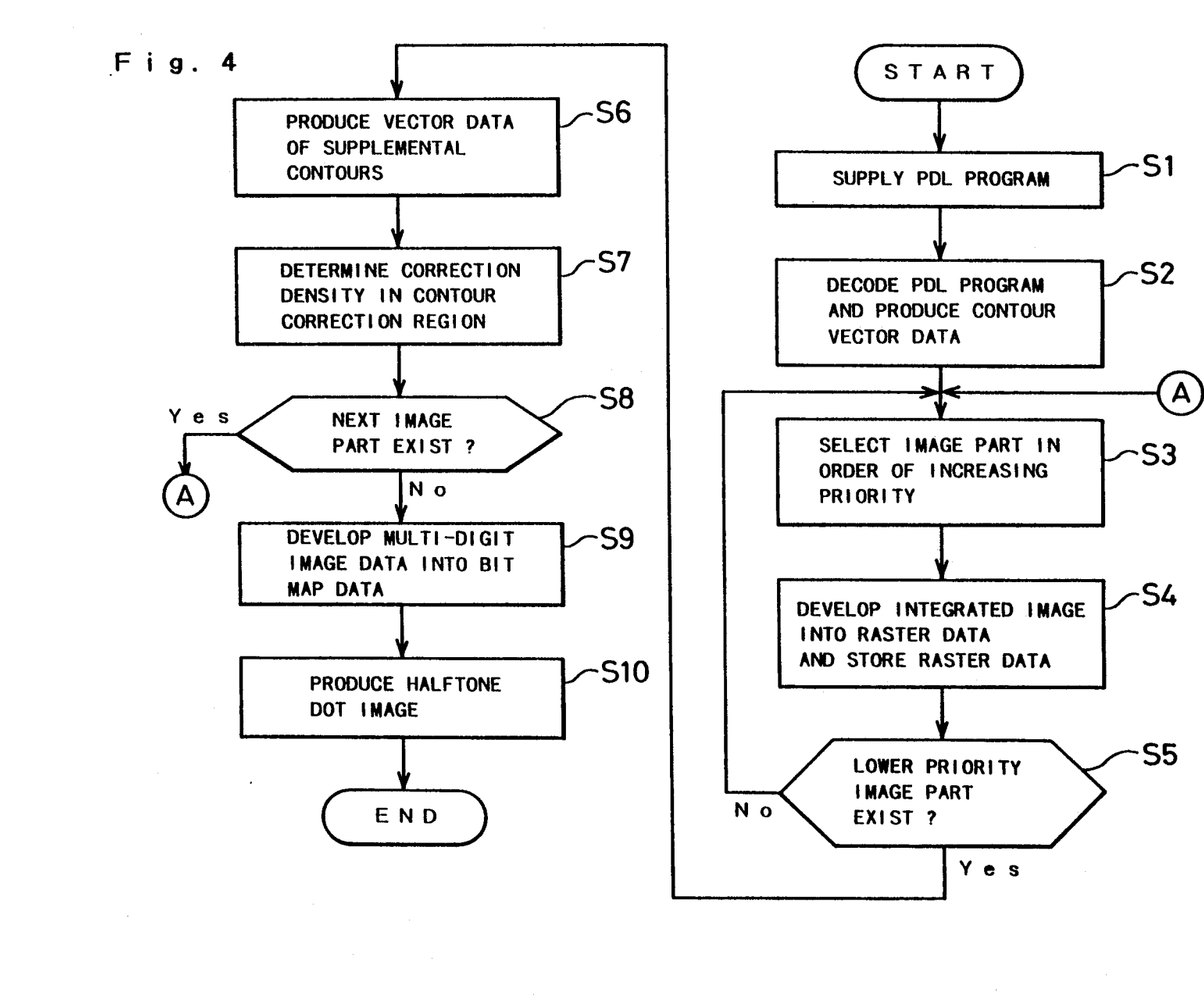
FIG. 4 is a flowchart illustrating processing steps of the first embodiment.

FIG. 4 is a flowchart showing processing steps for correcting a contour in an integrated image in the first embodiment of the present invention.

Figure 5A:
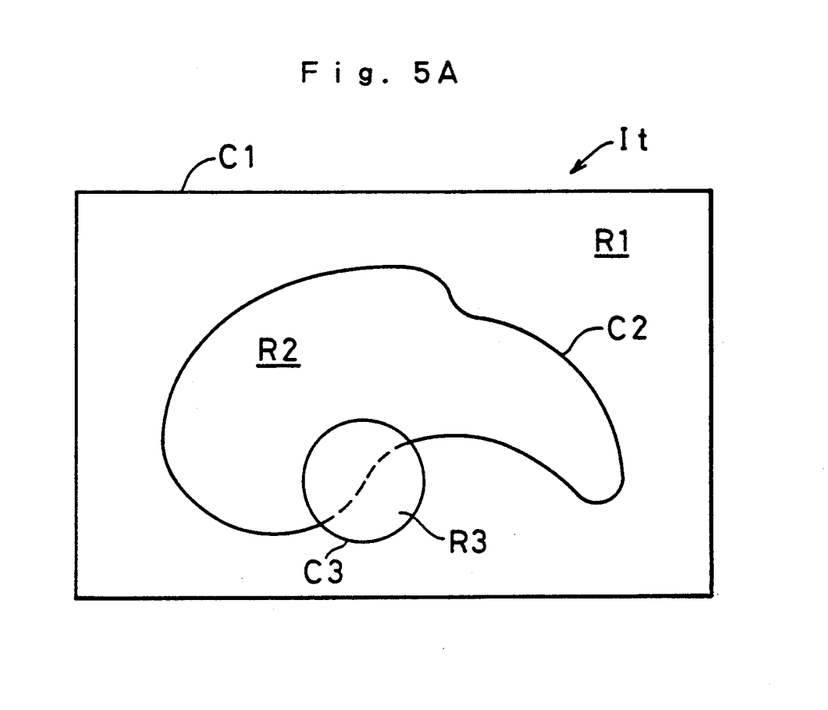
FIGS. 5A and 5B are plan views illustrating images to be processed in the first embodiment.

At a step S1, a PDL program is supplied from the front end processor 1 or 3 to the integrated image recording apparatus 5 and is sent through the front end interface 11 to be stored into the RAM 17. FIG. 5A shows an example of an integrated image "It" to be processed. The integrated image It includes first through third image parts R1 through R3. The first image part R1 forms a background region of the integrated image It, and a contour Cl of the first image part R1 forms the contour of the integrated image It. The second and third image parts R2 and R3 are regions defined by contours C2 and C3, respectively. The image parts R3, R2, and R1 have priorities in that order, which are previously specified by an operator. In the integrated image It, a portion of the image part with a lower priority is overlaid by the image part with a higher priority. When the integrated image It includes a picture element, data representing the picture element are stored in the second magnetic disk 21 at the step S1.

At a step S2, the CPU 13 decodes the PDL program and produces vector data representing the contour of each image part of the integrated image It. When an image part is a diagram, its contour is specified by the PDL program; the CPU 13 produces vector data representing the contour of the diagram and temporarily stores the vector data into the RAM 17. When an image part is a character, its font is specified by the PDL program; the CPU 13 reads the specified character font (or outline font) out of the first magnetic disk 19 and temporality stores the font into the RAM 17. The character font is vector data representing the outline of the character image. When an image part is a picture element, its contour is specified by the PDL program; the CPU 13 creates vector data representing the contour of the picture element and temporarily stores the data into the RAM 17.

Each of the three image parts R1 through R3 in FIG. 5A is assumed to be a diagram image of a uniform tint for simplicity. At the step S2, vector data are produced representing the contours Cl through C3 of the image parts R1 through R3, respectively. Vector data representing the contours of all the image parts in the integrated image It are stored in the RAM 17.

At a step S3, an image part is selected in order of increasing priority. The image part R1 has the lowest priority in the integrated image It of FIG. 5A. Therefore, the image part R1 is selected at this stage.

At a step S4, the integrated image It is developed into raster data on the basis of the vector data stored in the RAM 17 and on the image data of the picture elements stored in the magnetic disc 21, and the raster data is memorized in the multiple-digit frame memory 23.

At the following steps S5 through S7, processing is executed for correcting the contour of each image part R1, R2, or R3.

At the step S5, the presence of an image part with a lower priority than the selected image part R1 is detected. When no such image part exists, the contour correction processing is not required and the procedure returns from the step S5 to the step S3, at which an image part with the second lowest priority is selected. In the integrated image It of the embodiment being described the second image part R2 is selected at the step S3.

Figure 5B:
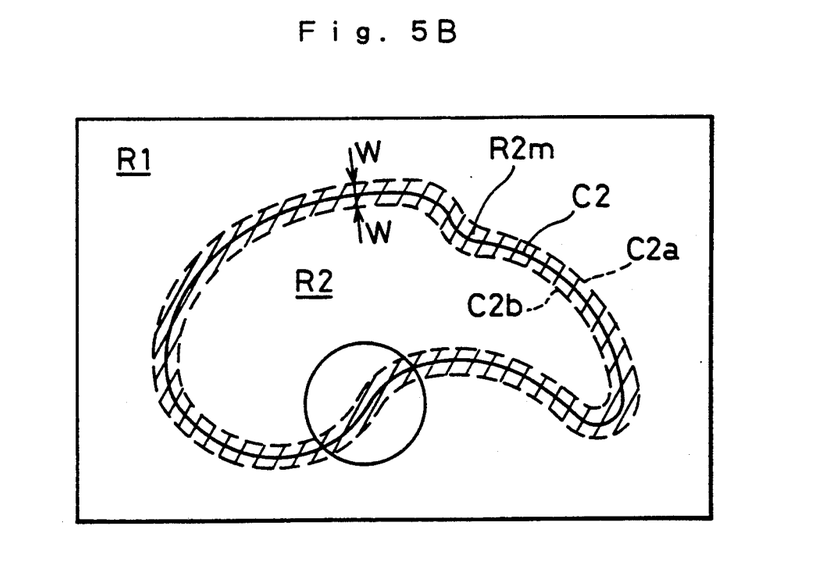

At the step S6, the CPU 13 generates vector data representing two supplemental contours C2a and C2b shown in FIG. 5B, based on the vector data for the contour C2 of the selected image part R2. The supplemental contours C2a and C2b are determined by enlarging (or expanding) and reducing (or contracting) the contour C2 by a specified width W, respectively. Such data processing is conventionally executed.

A region R2m (a shaded region in FIG. 5B) defined by the two supplemental contours C2a and C2b is a target region for the contour correction processing. Such region as R2m is hereinafter referred to as the contour correction region. The width W is predetermined by an operator. It may for example, be selected to equal to a length of one or two pixels.

At the step S7, the CPU 13 determines a correction density in the contour correction region R2m in the following manner and corrects the density of the image stored in the multiple digit frame memory 23.

Figure 6A:
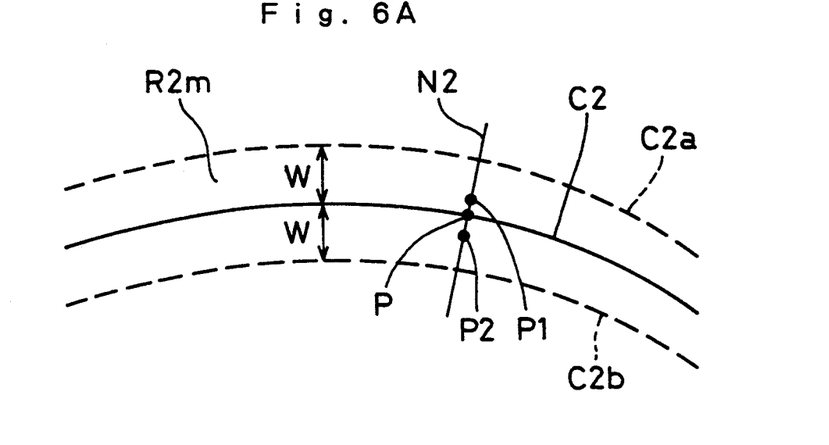
FIGS. 6A and 6B illustrate a method of detecting pixels adjacent to a pixel of interest on a contour.

FIG. 6A is an explanatory view illustrating the method for determining the correction density in the contour correction region. A normal N2 perpendicular to the contour C2 is drawn through a pixel P of interest on the contour C2. Pixels P1 and P2 are detected, which exist on the normal N2 and are adjacent to the pixel P of interest. The density D1 of the pixel P1 is compared with the density D2 of the pixel P2, and the larger density Dmax of the two is determined as the correction density.

$$D_{max} = \max(D1, D2)... \quad (1)$$

The density D1 and D2 can be replaced by mean densities for two sets of pixels which exist on the normal N2 and in respective image parts R1 and R2 within the contour correction region.

All pixels on the normal N2 are filled with the correction density Dmax. Accordingly, in the multiple digit frame memory 23, all the pixels on the normal N2 within the contour correction region have the same density, Dmax.

On completion of the above processing of the pixel P, another pixel on the contour C2 is subsequently processed in the same manner. All pixels on the contour C2 are successively processed as above; accordingly, all pixels in the contour correction region R2m shown in FIG. 5B are corrected to have the same density Dmax. All the pixels in the contour correction region R2m are thus filled with the same density Dmax values; namely, the contour C2 is shifted to either of the supplemental contours C2a and C2b.

Alternatively, the contour correction region R2m including the contour C2 may be divided into some equal region and the mean density of the two image parts in each divided region may be used as a correction density for the divided region.

When the density of an image is expressed in terms of dot % (or halftone-dot area rate), the densities D1, D2, and Dmax are also expressed in dot %.

Figure 6B:
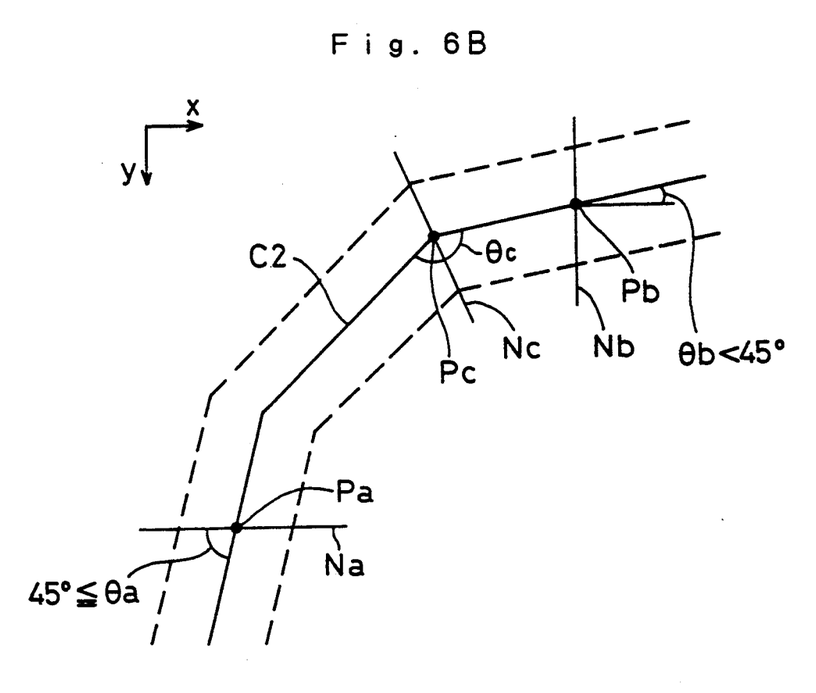

A simpler method shown in FIG. 6B my be applied instead of that shown in FIG. 6A to detect pixels adjacent to the pixel P of interest. When a pixel of interest, e.g., Pa, is positioned on the contour C2 that is at an angle $\theta a$ of no less than 45 degrees from a subscanning direction x, pixels adjacent to the pixel Pa of interest are detected on a line Na which runs through the pixel Pa of interest and parallel to the subscanning direction x. When a pixel of interest, e.g., "Pb" which is positioned on the contour C2 that is at an angle $\theta b$ of less than 45 degrees from the subscanning direction x, pixels adjacent to the pixel Pb of interest are detected on a line Nb which runs through the pixel Pb of interest and perpendicular to the subscanning direction x. When a pixel of interest, e.g., "Pc" which is positioned at an inflection, i.e., at a point where the gradient of the contour C2 changes, pixels adjacent to the pixel Pc of interest are detected on a line Nc which bisects an angle $\theta c$ which is formed by the contour parts across the pixel Pc. In this method, normals of the contour are not necessarily determined for detecting pixels adjacent to each pixel of interest. This method is simpler and much quicker than the methods described before.

When the presence of another image part to be processed is detected at step S8, the procedure returns to the step S3 at which step an image part with the lowest priority among remaining image parts is selected and processed. In the integrated image It of FIG. 5A, at this stage, the third image part R3 is selected to be processed at the step S4.

When the density correction in the contour correction region for all the image parts R1 through R3 is completed, the procedure proceeds to a step S9 at which multiple digit image data stored in the multiple digit frame memory 23 are developed into bit map data. In detail, multiple digit image data are supplied from the multiple digit frame memory 23 to the dot generator 25, which converts the multiple digit image data into binary image data representing a halftone integrated image with one bit data for each pixel, and writes the binary image data into the binary frame memory 27.

The conversion of the multiple digit image data into the binary image data by the dot generator 25 can be implemented by a software program carried out by the CPU 13. The binary frame memory 27 can be a page memory having a capacity to memorize binary data for the whole page of an integrated image, or a band buffer having a capacity to memorize binary data for part of the integrated image.

At a step S10, the binary image data stored in the binary frame memory 27 are supplied to the recording scanner 29 to form a halftone dot image based on the binary image data.

As described above, in the first embodiment of the invention, two supplemental contours are found with respect to the contour of each image part on the multiple digit frame memory. The density of an contour correction region defined by the two supplemental contours is then changed to a correction density Dmax obtained by the expression (1). The method of the first embodiment therefore has the advantage of facilitating contour correction based only on the contour and the density distribution of each image part.

B. Second Embodiment

B-1: Structure of Apparatus

Figure 7:
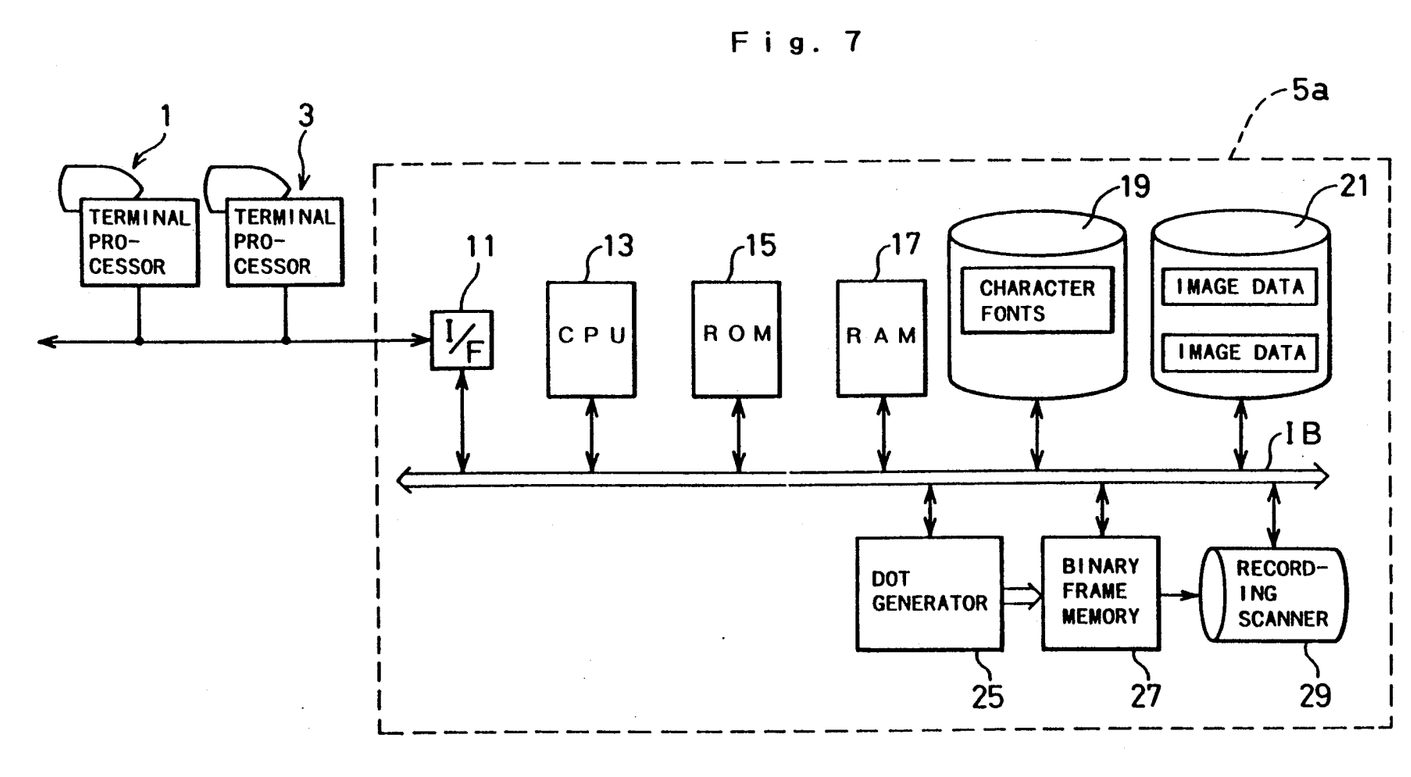
FIG. 7 illustrates the overall structure of apparatus to which a second embodiment of the present invention is applied.

FIG. 7 is a block diagram illustrating an image editing system of a second embodiment according to the present invention.

The image editing system includes front end processors 1 and 3 and an integrated image recording apparatus 5a, which are connected to one another through a LAN (local area network).

In the second preferred embodiment, the integrated image recording apparatus 5a has substantially the same structure as that of the integrated image recording apparatus 5 of the first embodiment except for the multiple digit frame memory 23, which is not required in the second embodiment as described below.

B-2: Processing Steps

Figure 8:
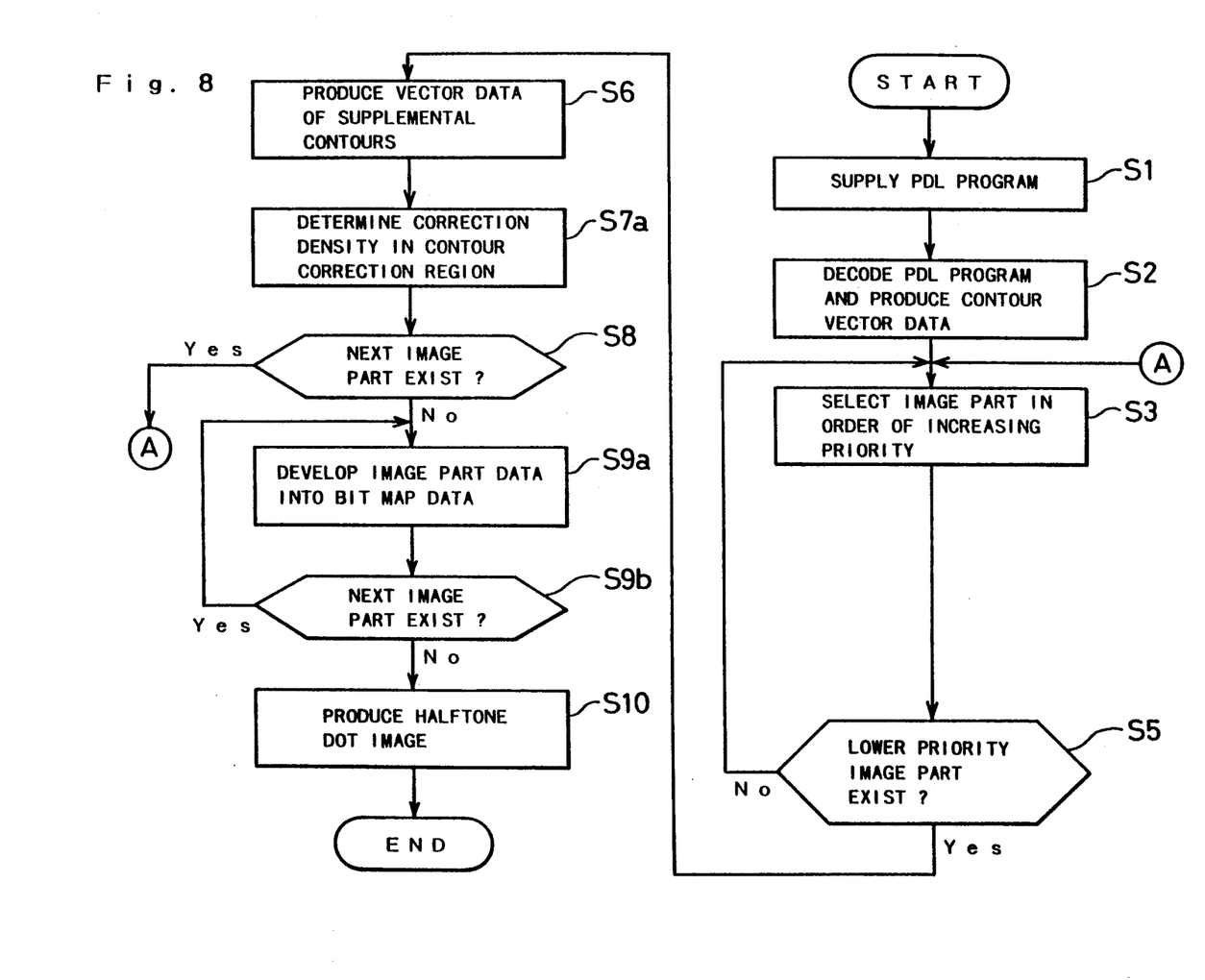
FIG. 8 is a flowchart illustrating processing steps of the second embodiment.

FIG. 8 is a flowchart showing processing steps for correcting a contour of an integrated image in the second embodiment of the present invention. Steps S1, S2, S3, S5, S6, S8, and S10 in the second embodiment are identical to those of the first embodiment shown in FIG. 4.

Figure 9A:
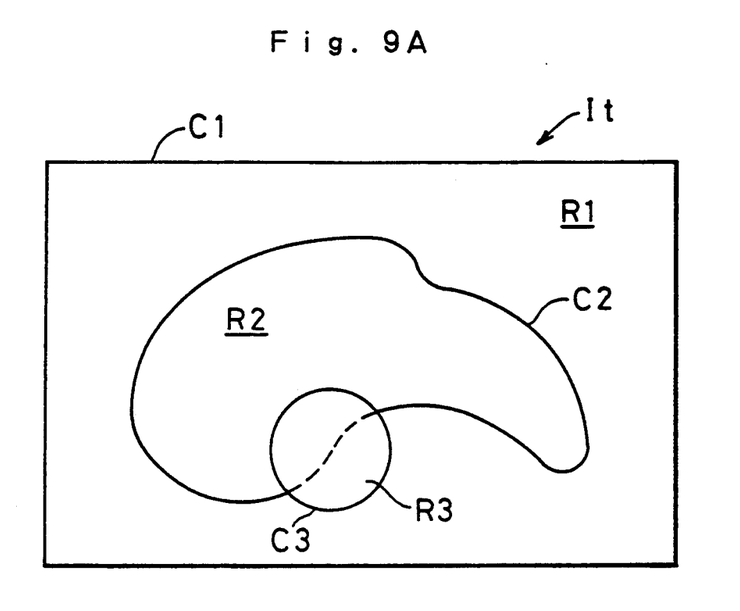
FIGS. 9A through 9C are plan view illustrating images to be processed in the second embodiment.

FIG. 9A shows an integrated image "It" to be processed in the second embodiment, which is the same as the integrated image It of the first embodiment.

At the steps S1 and S2, vector data representing contours of all image parts R1 through R3 of the integrated image It as well as data designating priorities of the image parts R1 through R3 are stored in a RAM 17 in the same manner as the first embodiment.

In the second embodiment, the step S4 of FIG. 4 is not performed since the integrated image recording apparatus 5a does not include a multiple digit frame memory.

The procedure proceeds to step S3, at which an image part with the lowest priority is selected, and then goes to the step S5. As explained in the first embodiment, after the image part R1 is selected at the step S3, the procedure returns from the step S5 to step S3 where the image part R2 with the second lowest priority is selected.

Figure 9B:
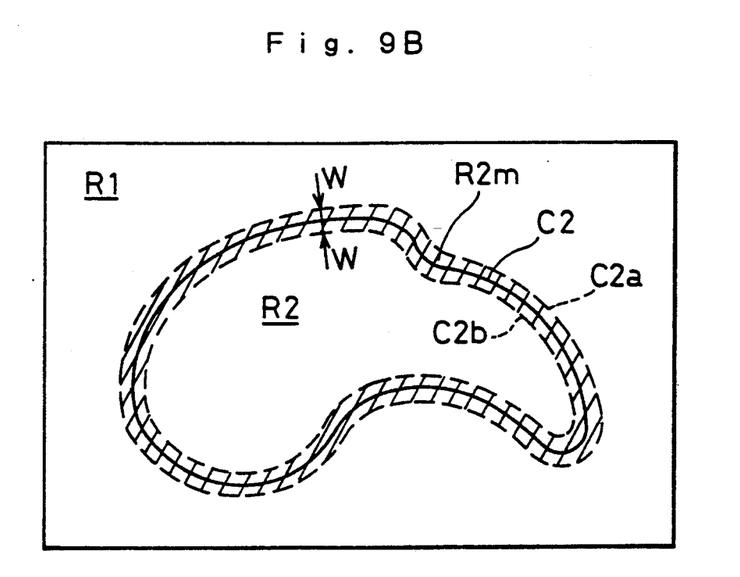

At the step S6, CPU 13 creates vector data representing two supplemental contours C2a and C2b as shown in FIG. 9B based on vector data representing a contour C2 of the selected image part R2.

At step S7a, the CPU 13 determines a correction density in an contour correction region R2m defined to be surrounded by the two supplemental contours C2a and C2b in the following manner: First, a density D2 of the selected image part R2 is compared with a density Db of that portion of the image part R1 of the next lower priority which portion exists in the contour correction region R2m. A larger density of the two is determined as a correction density Dsc in the contour correction region R2m as follows:

$$Dsc = \max(Db, D2)\ldots \tag{2}$$

Figure 10A:
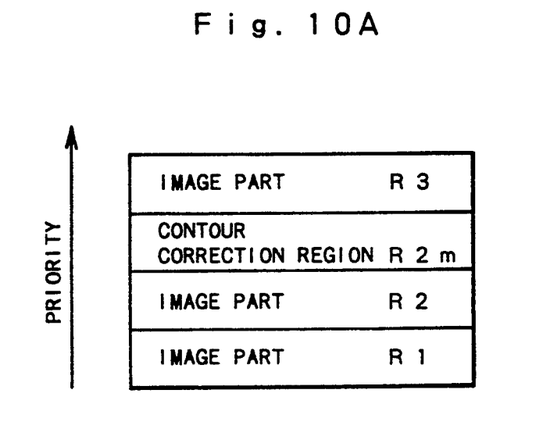
FIGS. 10A and 10B are conceptional views showing priorities of the image parts in the second embodiment.

After the contour correction region R2m and the correction density Dsc are determined, an image of the contour correction region R2m is treated as a new image part, and image data representing the contour correction region R2m is stored in the RAM 17. At this time, the contour correction region R2m is given a next higher priority than the original image part R2 selected at the step S4, as shown in FIG. 10A.

In the first embodiment, the correction density defined by the expression (1) is determined for all pixels on the contour C2 and then the contour correction region R2m is filled with the correction density. In the second embodiment, a shape and a density of a contour correction region are determined for each image part. This, and the fact that the image parts R1, R2, and R3 have a uniform density, makes it easy to find the densities Db and D2 for each image part from the image data of each image part. Thus the method of the second embodiment is much simpler than that of the first embodiment.

Figure 11:
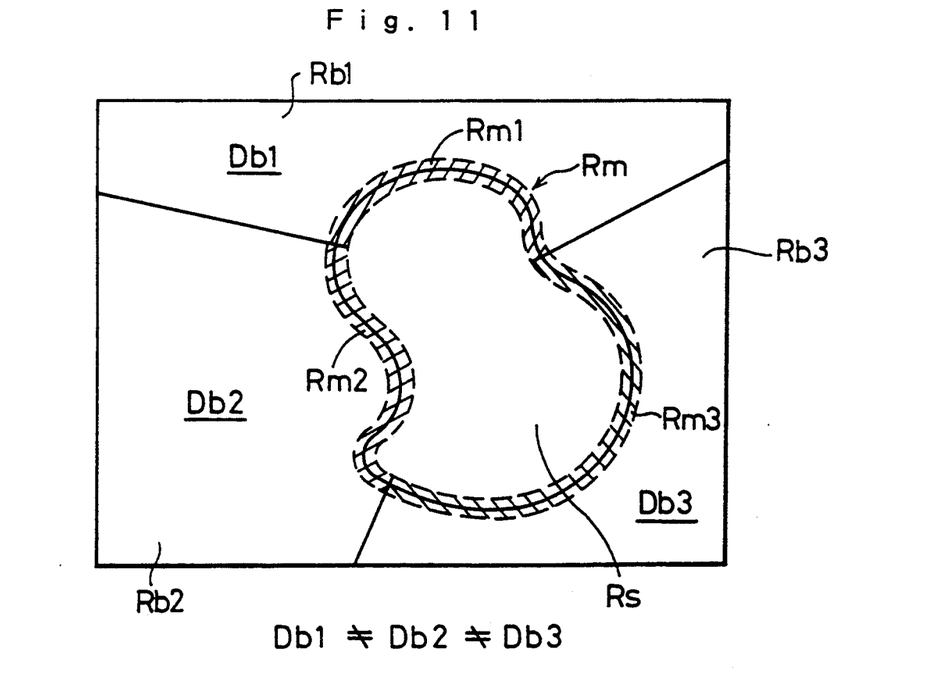
FIG. 11 is a plan view illustrating division of the contour correction region in the second embodiment.

When, as shown in FIG. 11, plural image parts Rb1, Rb2, and Rb3 of lower priority than that of the image part Rs of interest exist in an contour correction region Rm, and when densities Db1 through Db3 thereof are different from each other, the contour correction region Rm is divided at the boundaries between the densities Db1 through Db3. The correction density Dsc is determined from the expression (2) for each divided contour correction region Rm1, Rm2, or Rm3.

When another image part to be processed exists at the step S8, the procedure returns to the step S3 at which point an image part of the lowest priority among the remaining is selected.

Figure 10B:
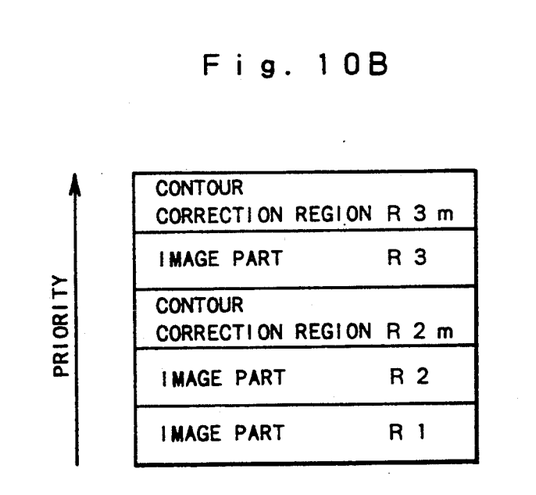

As described above, the contour correction region and the correction density are determined for each image part, and image data for each contour correction region, which is treated as a new image part, is stored in the RAM 17. As a result, image data for the image parts R1, R2, R2m, R3, R3m are stored in the RAM 17 as shown in FIG. 10B. Each image data includes vector data representing the contour of each image part and density data indicating the density within each image part.

In the second embodiment, since the contour correction region is processed based on vector data representing the contour of each image part, the step S4 of FIG. 4 and the frame memory 23 are not required. Image data, however, may be converted into raster data and temporarily stored in a multiple digit frame memory, if desired, as in the first embodiment.

At the next steps S9a and S9b, image data for each image part stored in the RAM 17 are developed into a bit map in order of increasing priority. At the step S9a, image data for the image part R1 of the lowest priority is supplied from the RAM 17 to the dot generator 25, which converts the image data into binary image data representing a halftone-dot image. The binary image data is written in the binary frame memory 27.

If processing of the contour correction region is executed with the multiple digit frame memory 23 as in the first embodiment, image data converted into raster data may be written in the multiple digit frame memory 23 and further converted into binary data by the dot generator 25.

The procedure then returns from the step S9b to the step S9a, and image data for the image part R2 of the second lowest priority is developed into bit map data. An area where the image parts R1 and R2 overlap each other is overlaid with the image data for the image part R2 of higher priority at this stage.

Binary image data for the contour correction region R2m is then written over binary image data for the image parts R1 and R2. This process of writing the binary image data for the contour correction region over the binary image data for its original image part is equivalent to shifting the contour of the original image part to either of the two supplemental contours.

Figure 9C:
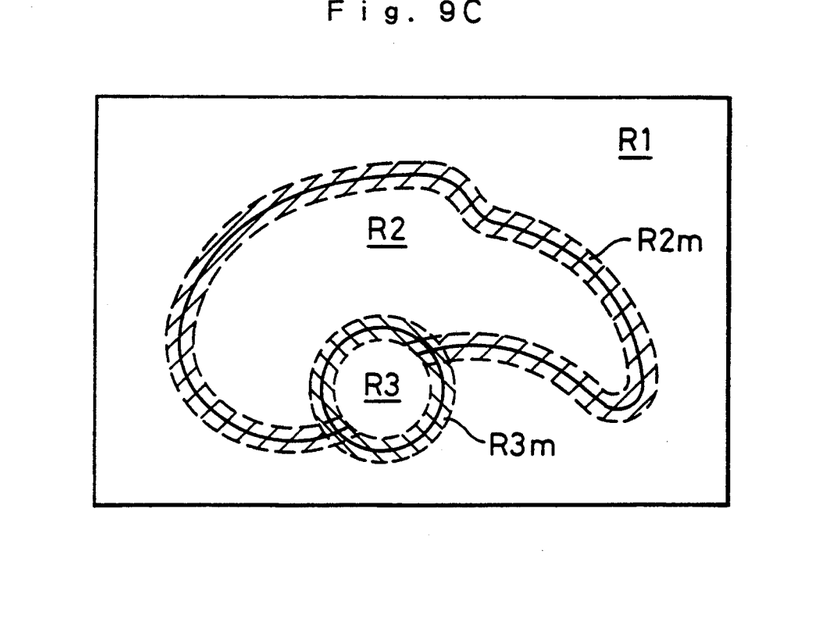

Binary image data for all the image parts R1, R2, R2m, R3, and R3m are written in the binary frame memory by repeating the steps S9a and S9b. FIG. 9C schematically illustrates an image represented by the image data written in the binary frame memory 27 according to the above procedure.

At the step S10, the binary image data stored in the binary frame memory 27 are supplied to the recording scanner 29, which forms a halftone-dot image based on the binary image data.

As described above, in the second embodiment of the present invention, two supplemental contours are found with respect to the contour of each image part. The density of the contour correction region defined by the two supplemental contours is then changed to the density Dsc determined from the expression (2). The contour correction region is treated as a new image part of a next priority higher than that of its original image part, and image data for the contour correction region are stored with that priority. Finally, an integrated image is formed while developing the image data for the contour correction regions and the original image parts in order of priority; thus, the contours in the integrated image are easily corrected in the second embodiment.

The embodiments above are not intended to limit the invention to the described embodiments. The invention may be embodied in other specific forms without departing from the spirit or essential characteristics thereof.

A density Dmin or Dsc determined from the following expression (1a) or (2a) may be used as a correction density for an contour correction region instead of the density Dmax or Dsc obtained by the expression (1) or (2), respectively.

$$Dmin = min\ (D1, D2)... \quad (1a)$$

$$Dsc = min\ (Db, D2)... \quad (2a)$$

Preferably, the expression (1) or (2) is applied when halftone positives are to be produced, and the expression (1a) or (2a) is applied when halftone negatives are to be produced.

Alternatively, a preferable expression may be specified by an operator. For example, the expression (1) or (2) is used responsive to a positive input value for a width 2 W (or a half width W) of the contour correction region; and the expression (1a) or (2a) is used responsive to its negative input value.

When adjacent image parts are all light in color and have insignificantly small difference in density, a drop-out due to registration mismatch is not distinguishable and thus does not require the contour correction. Thus, the contour correction described above might be executed only when densities of adjacent image parts and a difference of those densities are less than predetermined threshold values, respectively. This makes the whole processing much quicker because the contour correction is executed only for image parts requiring the processing.

Image parts subjected to the contour correction processing may be previously specified by an operator. The operator determines necessity of the contour correction processing for each image part and specifies a width 2

W (or a half width W) of an contour correction region for each image part.

Preferably, characters are not corrected in contours but are printed as they are. A region of a lower density, i.e., a background region, may be expanded to be partly or totally overlapped with a region of characters instead of correcting character contours.

An operator may determine necessity of the contour correction and a width 2 W (or a half width W) of a contour correction region for each color component (Y, M, C, K) of an image part.

Predetermination of image parts (or color components thereof) subjected to the contour correction processing makes the whole processing much quicker because the contour correction is executed only for image parts requiring the processing.

According to the present invention, the contour of a specific image part is substantially shifted to either of the two supplemental contours by filling the contour correction region defined by the two supplemental contours with the correction density. The contour of the image will be accordingly corrected without a skilled operator.

Although the present invention has been described and illustrated in detail, it is clearly to be understood that the same is by way of illustration and example only and is not to be taken by way of limitation, the spirit and scope of the present invention being limited only by the terms of the appended claims.

What is claimed is:

1. A method of correcting a contour of an image part in an integrated image comprising plural image parts, comprising the steps of:
   (a) drawing two supplemental contours with a supplemental contour production means, each supplemental contour being disposed on a respective side of said contour and being spaced from said contour by a predetermined distance and extending along the entirety of said contour;
   (b) comparing, by using a correction density determination means, first and second densities of first and second portions of a contour correction region defined between said two supplemental contours, said first and second portions being located on opposed sides of said contour, and determining a correction density in said contour correction region on the basis of said comparison; and
   (c) filling said contour correction region with said correction density to substantially obtain a corrected contour.

2. A method of correcting a contour of an image part in an integrated image comprising plural image parts, comprising the steps of:
   (a) preparing and storing in a memory means image part data representing said image parts, and contour data representing said contour;
   (b) obtaining two sets of supplemental contour data representing two supplemental contours with a supplemental contour production means, each supplemental contour being spaced from said contour by a predetermined distance and extending along the entirety of said contour and being disposed on a respective side of said contour;
   (c) comparing, by using a correction density determination means, on the basis of said image part data, first and second densities of first and second portions of a contour correction region defined between said two supplemental contours, said first and second portions being located on opposed sides of said contour, and determining a correction density in said contour correction region on the basis of said comparison; and
   (d) producing corrected integrated-image data representing a corrected integrated-image filled with said correction density.

3. A method in accordance with claim 2, wherein said contour data prepared at said step (a) represent respective contours of said image parts;
   said step (a) further comprises the step of:(a-1) specifying a priority for each of said image parts; and
   said method comprises, between said steps (a) and (b), the step of: (e) selecting one of said image parts in order of increasing priority; and wherein
   the method is serially executed from said step (e) through said step (c) for each of at least those image parts which have priorities higher than a lowest priority.

4. A method in accordance with claim 3, wherein said step (a) further comprises the step of: (a-2) preparing an image frame memory for memorizing raster image data for at least a part of said integrated image; and
   said method comprises, between said steps (e) and (b), the steps of:
   (f) obtaining raster image data of the selected image part on the basis of said image part data and overwriting said raster image data in said image frame memory; and
   said step (d) is performed by changing a density of said contour correction region with said correction density in said raster image data stored in said image frame memory; and
   the method is serially executed from step (e) through said step (d) for each of at least those image parts which have priorities higher than the lowest priority.

5. A method in accordance with claim 4, wherein said step (c) is performed for each pixel on said contour while said first and second densities are found with respect to pixels located on opposed sides relative to said contour.

6. A method in accordance with claim 5, wherein each said image part has a respective uniform density.

7. A method in accordance with claim 6, wherein said correction density is determined to be the higher of said first and second densities.

8. A method in accordance with claim 7, wherein said raster image data is multi-digital data.

9. A method in accordance with claim 3 wherein said step (a) further comprises the step of: (a-2) preparing an image frame memory for memorizing raster image data for at least a part of said integrate image; and
   said method further comprises, between said steps (c) and (d), the step of:
   (g) defining said contour correction region filled with said correction density as a new image part having a priority just above the priority of the selected image part selected at said step (a-1), and producing image part data representing said new image part; and wherein
   the method is serially executed from said step (e) through said step (g) for each of at least those image parts which have priorities higher than the lowest priority; and
   said step (d) is performed by repeating the steps of:
   (d-1) selecting one of said image parts in order of increasing priority;

(d-2) obtaining raster image data of the selected image part on the basis of said image part data; and (d-3) overwriting said raster image data in said image frame memory.

10. A method in accordance with claim 9, wherein said step (c) comprises the steps of:

(c-1) finding subregions in that part of said contour correction region which is other than said selected image part, said subregions belonging to respective image parts different from each other; and (c-2) performing said comparing and said determining with respect to each of said subregions.

11. A method in accordance with claim 10, wherein each said image part has a respective uniform density.

12. A method in accordance with claim 11, wherein said correction density is determined to be the higher of said first and second densities.

13. An apparatus for correcting a contour of an image part in an integrated image comprising plural image parts, comprising:

memory means for storing image part data representing said respective image parts and contouring data representing said contour;

supplemental contour production means for obtaining two sets of supplemental contour data representing two supplemental contours, each said supplemental contour being spaced from said contour by a predetermined distance and extending along the entirety of said contour and being disposed on a respective side of said contour;

correction density determination means for comparing, on the basis of said image part data, first and second densities of first and second portions of a contour correction region defined between said two supplemental contours, said first and second portions being located on opposed sides of said contour, and determining a correction density in said contour correction region on the basis of said comparison; and corrected data production means for producing corrected integrated-image data representing a corrected integrated-image filled with said correction density.

14. An apparatus in accordance with claim 13, wherein said contour data represent respective contours of said image parts; and said apparatus further comprising:

means for specifying a priority for each of said image parts; and selection means for selecting one of said image parts in order of increasing priority; and wherein said selection means, said supplemental contour production means, and said correction density determination means serially perform processing for each of at least those image parts which have priorities higher than a lowest priority.

15. An apparatus in accordance with claim 14 further comprising:

an image frame memory for memorizing raster image data for at least a part of said integrated image; and raster data obtaining means for obtaining raster image data of the selected image part selected by said selection means on the basis of said image part data and overwriting said raster image data in said image frame memory; and wherein said corrected data production means is effective for changing a density of said contour correction region with said correction density in said raster image data stored in said image frame memory; and said selection means, said raster data obtaining means, said supplemental contour production means, said correction density determination means, and said corrected data production means being effective to serially perform processing for each of at least those image parts which have priorities higher than the lowest priority.

16. An apparatus in accordance with claim 15, wherein said correction density determination means performs said comparing and said determining for each pixel on said contour while said first and second densities are found with respect to pixels located on opposed sides of said contour.

17. A method in accordance with claim 16, wherein each said image part has a respective uniform density.

18. An apparatus in accordance with claim 17, wherein said correction density is determined to be the higher of said first and second densities.

19. An apparatus in accordance with claim 18, wherein said raster image data is multi-digital data.

20. An apparatus in accordance with claim 14 further comprising:

an image frame memory for memorizing raster image data for at least a part of said integrated image; and image part definition means for defining said contour correction region filled with said correction density as a new image part having a priority just above the priority of the selected image part selected by said selection means, and for producing image part data representing said new image part; and wherein said selection means, said supplemental contour production means, said correction density determination means, and said image part definition means are effective to serially perform processing for each of at least those image parts which have priorities higher than the lowest priority; and said corrected data production means comprises:

first means for selecting one of said image parts in order of increasing priority;

second means for obtaining raster image data of the selected image part selected by said first means on the basis of said image part data; and third means for overwriting said raster image data in said image frame memory; and wherein said corrected data production means repeatedly performs processing of said first to third means.

21. An apparatus in accordance with claim 20, wherein said correction density determining means comprises:

means for finding subregions in that part of said contour correction region which is other than said selected image part, said subregions belonging to respective image parts different from each other; and means for performing said comparing and said determining with respect to each of said subregions.

22. A method in accordance with claim 21, wherein each said image part has a respective uniform density.

23. An apparatus in accordance with claim 22, wherein said correction density is determined to be the higher of said first and second densities.

* * * * *